United States Patent [19]

Milunas

[11] Patent Number: 4,843,551
[45] Date of Patent: Jun. 27, 1989

[54] FAILURE MODE SHIFT PATTERN ALTERATION FOR AN ELECTRONICALLY CONTROLLED TRANSMISSION

[75] Inventor: Rimas S. Milunas, Royal Oak, Mich.

[73] Assignee: Saturn Corporation, Troy, Mich.

[21] Appl. No.: 101,940

[22] Filed: Sep. 28, 1987

[51] Int. Cl.$^4$ .................. B60K 41/08; G60F 15/50
[52] U.S. Cl. .................. 364/424.1; 74/866
[58] Field of Search ............... 364/424.1; 74/862, 866

[56] References Cited

U.S. PATENT DOCUMENTS

| | | | |
|---|---|---|---|
| 4,414,863 | 11/1983 | Heino | 74/866 |
| 4,495,457 | 1/1985 | Stahl | 364/424.1 |
| 4,499,450 | 2/1985 | Makita | 364/424.1 |
| 4,523,281 | 6/1985 | Noda et al. | 364/424.1 |
| 4,561,055 | 12/1985 | McKee | 364/424.1 |
| 4,667,541 | 5/1987 | Shimaoka et al. | 364/424.1 |
| 4,718,307 | 1/1988 | Yabe et al. | 364/424.1 |

Primary Examiner—Felix D. Gruber
Assistant Examiner—Christopher L. Makay
Attorney, Agent, or Firm—Mark A. Navarre

[57] ABSTRACT

An electronic transmission control in which the shift pattern is adjusted in the event of a sensed clutch or gear failure so that shifting between the nonfailed ratios is carried out in a manner which avoids engine stalling or overspeeding and significant stressing of the transmission gear elements. The original shift point lines involving the failed ratio are removed and replaced with a single shift point line positioned intermediate the original two. The new shift point line is determined in accordance with an arithmetic combination of the original shift point lines, and is limited based on engine overspeed and driveability considerations.

4 Claims, 5 Drawing Sheets

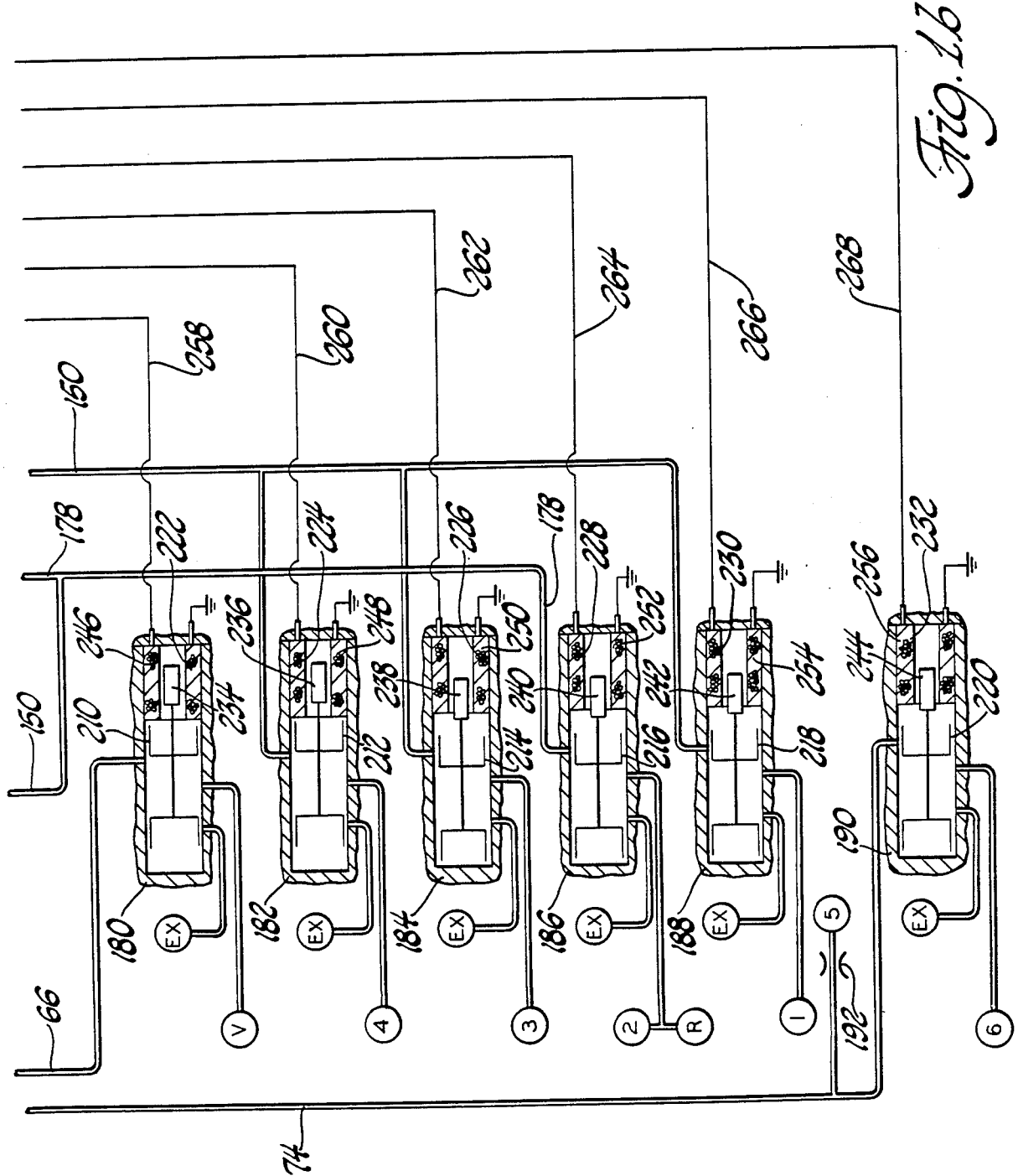

FAILURE MODE SHIFT PATTERN ALTERATION FOR AN ELECTRONICALLY CONTROLLED TRANSMISSION

This invention relates to the scheduling of speed ratio shifting in a motor vehicle automatic transmission, and more particularly to a control for altering the scheduled shift points in response to the detection of a transmission ratio failure.

BACKGROUND OF THE INVENTION

Motor vehicle automatic shift transmissions are generally equipped with fluid operated torque transmitting elements (referred to as clutches or brakes) which are selectively engageable to establish various speed ratio drives between the input and output shafts of the transmission. The shift points at which the transmission is shifted from one forward speed ratio to another are empirically determined to satisfy desired performance and/or economy concerns, and are typically scheduled as a combined function of the driver demand (engine throttle opening or accelerator pedal position) and the vehicle speed.

With electronic controls, the shift points are mapped to form a shift pattern look-up table in nonvolatile memory, the shift point lines being defined as a two-dimensional function of driver demand and vehicle speed. A representative look-up table for a four-speed automatic transmission is graphically depicted in FIG. 2. The table is addressed as a function of the driver demand term and yields a previously stored vehicle speed value which must be reached (exceeded in the case of an upshift) before a shift can occur. When the vehicle speed condition is met, the desired speed ratio is changed accordingly. If the desired ratio is not engaged, the transmission controller schedules a shift to the desired ratio. Although not shown, hysteresis between upshift and downshift lines is typically employed to minimize hunting.

The sophistication of electronic controls also permits a relatively comprehensive transmission failure analysis. For example, speed ratio progression during shifting operation and clutch slippage during nonshifting operation may be monitored to detect the occurrence of a ratio failure.

In the event of a failure, the shift pattern look-up table must somehow be modified in order to avoid damaging the transmission by shifting to a failed speed ratio. In the case of a failure of the lowermost or uppermost speed ratio, the failed ratio simply becomes unavailable. In the case of a failure of an intermediate speed ratio, however, the control becomes more difficult. While a different ratio could be substituted for the failed intermediate ratio (so that a normally scheduled shift to the failed ratio would result in a shift to the next higher or next lower ratio), the resulting shift is often unacceptable since the substituted gear is generally not suitable for the vehicle speed and load condition. As a result, engine stalling or overspeeding, and stressing of the transmission gear elements may occur.

SUMMARY OF THE PRESENT INVENTION

The present invention is directed to an electronic transmission control in which the shift pattern is adjusted in the event of a sensed intermediate ratio failure so that shifting between the remaining ratios is carried out in a manner which avoids engine stalling or overspeeding and significant stressing of the transmission gear elements.

When the failure of a given intermediate speed ratio is detected, the control of this invention effectively removes the two original shift point lines involving the failed ratio and replaces them with a single shift point line positioned intermediate the original two. The new shift point line is determined in accordance with an arithmetic combination of the original shift point lines, limited based on engine overspeed considerations and underspeed considerations, if necessary. Should a second failure occur, the shift point lines are re-altered as above to reflect the loss of both failed ratios and to create new shift points for the remaining ratios.

BRIEF DESCRIPTION OF THE DRAWINGS

FIGS. 1a and 1b schematically depict a computer based electronic transmission control system according to the teachings of this invention.

FIG. 7 depicts a main loop program; FIG. 8 depicts a routine for altering a shift pattern schedule in accordance with this invention.

DETAILED DESCRIPTION OF THE DRAWINGS

Figure 1A:
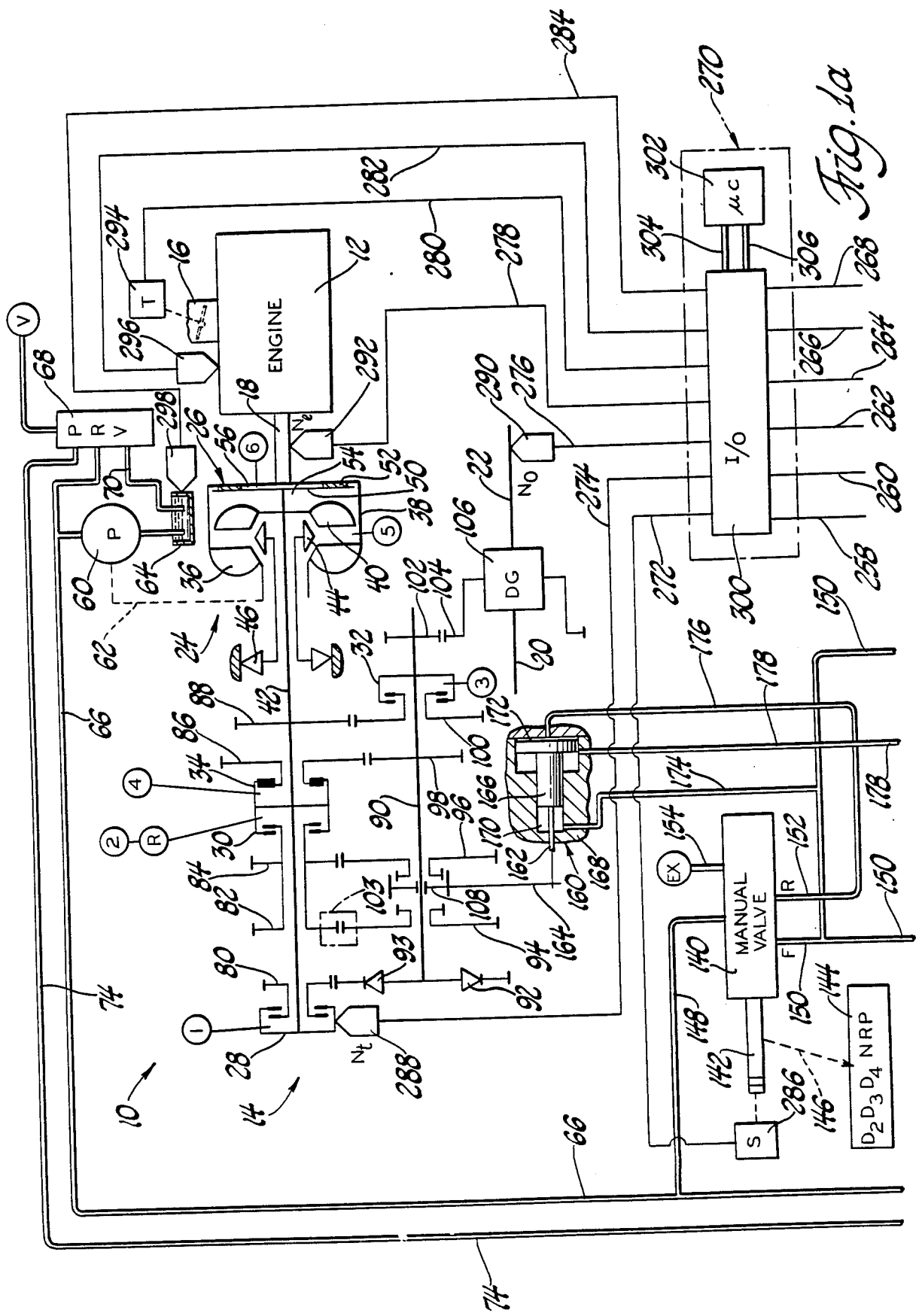

Referring now to FIGS. 1a and 1b, the reference numeral 10 generally designates a motor vehicle drive train including an engine 12 and a parallel shaft transmission 14 having a reverse speed ratio and four forward speed ratios. Engine 12 includes a throttle mechanism 16 mechanically connected to an operator manipulated device such as an accelerator pedal (not shown) for regulating engine output torque, such torque being applied to the transmission 14 through the engine output shaft 18. The transmission 14 transmits engine output torque to a pair of drive axles 20 and 22 through a torque converter 24 and one or more of the fluid operated clutching devices 26-34, such clutching devices being applied or released according to a predetermined schedule for establishing the desired transmission speed ratio.

Referring now more particularly to the transmission 14, the impeller or input member 36 of the torque converter 24 is connected to be rotatably driven by the output shaft 18 of engine 12 through the input shell 38. The turbine or output member 40 of the torque converter 24 is rotatably driven by the impeller 36 by means of fluid transfer therebetween and is connected to rotatably drive the shaft 42. A stator member 44 redirects the fluid which couples the impeller 36 to the turbine 40, the stator being connected through a one-way device 46 to the housing of transmission 14. The torque converter 24 also includes a clutching device 26 comprising a clutch plate 50 secured to the shaft 42.

The clutch plate 50 has a friction surface 52 formed thereon adaptable to be engaged with the inner surface of the input shell 38 to form a direct mechanical drive between the engine output shaft 18 and the transmission shaft 42. The clutch plate 50 divides the space between input shell 38 and the turbine 40 into two fluid chambers: an apply chamber 54 and a release chamber 56. When the fluid pressure in the apply chamber 54 exceeds that in the release chamber 56, the friction surface 52 of clutch plate 50 is moved into engagement with the input shell 38 as shown in FIG. 1, thereby engaging the clutching device 26 to provide a mechanical drive connection in parallel with the torque converter 24. In such case, there is no slippage between the impeller 36 and the turbine 40. When the fluid pressure in the release chamber 56 exceeds that in the apply chamber 54, the friction surface 52 of the clutch plate 50 is moved out of engagement with the input shell 38 thereby uncoupling such mechanical drive connection and permitting slippage between the impeller 36 and the turbine 40. The circled numeral 5 represents a fluid connection to the apply chamber 54 and the circled numeral 6 represents a fluid connection to the release chamber 56.

A positive displacement hydraulic pump 60 is mechanically driven by the engine output shaft 18 through the input shell 38 and impeller 36 as indicated by the broken line 62. Pump 60 receives hydraulic fluid at low pressure from the fluid reservoir 64 and supplies pressurized fluid to the transmission control elements via output line 66. A pressure regulator valve (PRV) 68 is connected to the pump output line 66 and serves to regulate the fluid pressure (hereinafter referred to as line pressure) in line 66 by returning a controlled portion of the fluid therein to reservoir 64 via the line 70. In addition, pressure regulator valve 68 supplies fluid pressure for the torque converter 24 via line 74. While the pump and pressure regulator valve designs are not critical to the present invention, a representative pump is disclosed in the U.S. Pat. No. 4,342,545 to Schuster issued Aug. 3, 1982, and a representative pressure regulator valve is disclosed in the U.S. Pat. No. 4,283,970 to Vukovich issued Aug. 18, 1981, such patents being assigned to the assignee of the present invention.

The transmission shaft 42 and a further transmission shaft 90 each have a plurality of gear elements rotatably supported thereon. The gear elements 80-88 are supported on shaft 42 and the gear elements 92-102 are supported on shaft 90. The gear element 88 is rigidly connected to the shaft 42 and the gear elements 98 and 102 are rigidly connected to the shaft 90. Gear element 92 is connected to the shaft 90 via a freewheeler or one-way device 93. The gear elements 80, 84, 86 and 88 are maintained in meshing engagement with the gear elements 92, 96, 98 and 100, respectively, and the gear element 82 is coupled to the gear element 94 through a reverse idler gear 103. The shaft 90, in turn, is coupled to the drive axles 20 and 22 through gear elements 102 and 104 and a conventional differential gear set (dg) 106.

A dog clutch 108 is splined on the shaft 90 so as to be axially slidable thereon and serves to rigidly connect the shaft 90 either to the gear element 96 (as shown) or the gear element 94. A forward speed relation between the gear element 84 and shaft 90 is established when dog clutch 108 connects the shaft 90 to gear element 96 and a reverse speed relation between the gear element 82 and shaft 90 is established when the dog clutch 108 connects the shaft 90 to the gear element 94.

The clutching devices 28-34 each comprise an input member rigidly connected to a transmission shaft 42 or 90 and an output member rigidly connected to one or more gear elements such that engagement of a clutching device couples the respective gear element and shaft to effect a driving connection between the shafts 42 and 90. The clutching device 28 couples the shaft 42 to the gear element 80; the clutching device 30 couples the shaft 42 to the gear elements 82 and 84; the clutching device 32 couples the shaft 90 to the gear element 100; and the clutching device 34 couples the shaft 42 to the gear element 86. Each of the clutching devices 28-34 is biased toward a disengaged state by a return spring (not shown). Engagement of the clutching device is effected by supplying fluid pressure to an apply chamber thereof. The resulting torque capacity of the clutching device is a function of the applied pressure less the return spring pressure, hereinafter referred to as the working pressure.

The circled numeral 1 represents a fluid passage for supplying pressurized fluid to the apply chamber of clutching device 28; the circled numeral 2 and letter R represent a fluid passage for supplying pressurized fluid to the apply chamber of the clutching device 30; the circled numeral 3 represents a fluid passage for supplying pressurized fluid to the apply chamber of the clutching device 32; and the circled numeral 4 represents a fluid passage for directing pressurized fluid to the apply chamber of the clutching device 34.

The various gear elements 80-88 and 92-100 are relatively sized such that engagement of first, second, third and fourth forward speed ratios are effected by engaging the clutching devices 28, 30, 32 and 34, respectively, it being understood that the dog clutch 108 must be in the position depicted in FIG. 1 to obtain a forward speed ratio. A neutral speed ratio or an effective disconnection of the drive axles 20 and 22 from the engine output shaft 18 is effected by maintaining all of the clutching devices 28-34 in a released condition. The speed ratios defined by the various gear element pairs are generally characterized by the ratio of the turbine speed $N_t$ to output speed $N_o$. Representative $N_t/N_o$ ratios for transmission 14 are as follows:

| FIRST - 2.368 | SECOND - 1.273 |
|---|---|
| THIRD - 0.808 | FOURTH - 0.585 |
| REVERSE - 1.880 | |

For the purpose of illustrating this invention, the FIRST ratio is referred to herein as the lowermost speed ratio, the FOURTH ratio is referred to as the uppermost ratio, and the SECOND and THIRD ratios are referred to as intermediate ratios.

Shifting from a current forward speed ratio to a desired forward speed ratio requires that the clutching device associated with the current speed ratio (offgoing) be disengaged and the clutching device associated with the desired speed ratio (on-coming) be engaged. For example, a shift from the first forward speed ratio to the second forward speed ratio involves disengagement of the clutching device 28 and engagement of the clutching device 30. The desirability of a shift is determined in accordance with a shift point or pattern table as a function of driver demand (throttle position %T) and vehicle speed $N_v$, such table being stored in the nonvolatile memory of control unit 270 as described below.

The fluid control elements of the transmission 14 include a manual valve 140, a directional servo 160 and a plurality of electrically operated fluid valves 180-190. The manual valve 140 operates in response to operator demand and serves, in conjunction with directional servo 160, to direct regulated line pressure to the appropriate fluid valves 182-188. The fluid valves 182-188, in turn, are individually controlled to direct fluid pressure to the clutching devices 28-34. The fluid valve 180 is controlled to direct fluid pressure from the pump output line 66 to the pressure regulator valve 68 and the fluid valve 190 is controlled to direct fluid pressure from the line 74 to the clutching device 26 of torque converter 24. The directional servo 160 operates in response to the condition of the manual valve 140 and serves to properly position the dog clutch 108.

The manual valve 140 includes a shaft 142 for receiving axial mechanical input from the operator of the motor vehicle in relation to the speed range the operator desires. The shaft 142 is also connected to an indicator mechanism 144 through a suitable mechanical linkage, as indicated generally by the broken line 146. Fluid pressure from the pump output line 66 is applied as an input to the manual valve 140 via the line 148, and the valve outputs include a forward (F) output line 150 for supplying fluid pressure for engaging forward speed ratios and a reverse (R) output line 152 for supplying fluid pressure for engaging the reverse speed ratio. Thus, when the shaft 142 of manual valve 140 is moved to the D4, D3 or D2 positions shown on the indicator mechanism 144, line pressure from the line 148 is directed to the forward (F) output line 150. When the shaft 142 is in the R position shown on the indicator mechanism 144, line pressure from the line 148 is directed to the reverse (R) output line 152. When the shaft 142 of manual valve 140 is in the N (neutral) or P (park) positions, the input line 148 is isolated, and the forward and reverse output lines 150 and 152 are connected to an exhaust line 154 which is adapted to return any fluid therein to the fluid reservoir 64.

The directional servo 160 is a fluid operated device and includes an output shaft 162 connected to a shift fork 164 for axially shifting the dog clutch 108 on shaft 90 to selectively enable either forward or reverse speed ratios. The output shaft 162 is connected to a piston 166 axially movable within the servo housing 168. The axial position of the piston 166 within the housing 168 is determined according to the fluid pressures supplied to the chambers 170 and 172. The forward output line 150 of manual valve 140 is connected via line 174 to the chamber 170 and the reverse output line 152 of manual valve 140 is connected via the line 176 to the chamber 172. When the shaft 142 of the manual valve 140 is in a forward range position, the fluid pressure in the chamber 170 urges piston 166 rightward, as viewed in FIG. 1, to engage the dog clutch 108 with the gear element 96 for enabling engagement of a forward speed ratio. When the shaft 142 of the manual valve 140 is moved to the R position, the fluid pressure in chamber 172 urges piston 166 leftward, as viewed in FIG. 1, to engage the dog clutch 108 with the gear element 94 for enabling engagement of the reverse speed ratio. In each case, it will be remembered that the actual engagement of the second or reverse speed ratio is not effected until engagement of the clutching device 30.

The directional servo 160 also operates as a fluid valve for enabling the reverse speed ratio. To this end, the directional servo 160 includes an output line 178 connected to the electrically operated fluid valve 186. When the operator selects a forward speed ratio, and the piston 166 of directional servo 160 is in the position depicted in FIG. 1, the passage between lines 176 and 178 is cut off; when the operator selects the reverse gear ratio, the passage between the lines 176 and 178 is open.

The electrically operated fluid valves 180–190 each receive fluid pressure at an input passage thereof from the pump 60 and are individually controlled to direct fluid pressure to the pressure regulator valve 68 or respective clutching devices 26–34. The fluid valve 180 receives line pressure directly from pump output line 66, and is controlled to direct a variable amount of such pressure to the pressure regulator valve 68 as indicated by the circled letter V. The fluid valves 182, 186 and 188 receive fluid pressure from the forward output line 150 of manual valve 140, and are controlled to direct variable amounts of such pressure to the clutching devices 34, 32 and 28, as indicated by the circled numerals 4, 3 and 1, respectively.

The fluid valve 186 receives fluid pressure from the forward output line 150 and the directional servo output line 178, and is controlled to direct a variable amount of such pressure to the clutching device 30 as indicated by the circled numeral 2 and the circled letter R. The fluid valve 190 receives fluid pressure from line 74 of pressure regulator valve 68, and is controlled to direct a variable amount of such pressure to the release chamber 56 of the clutching device 26 as indicated by the circled numeral 6. The apply chamber 54 of the clutching device 26 is supplied with fluid pressure from the output line 74 via the orifice 192 as indicated by the circled numeral 5.

Each of the fluid valves 180–190 includes a spool element 210–220, axially movable within the respective valve body for directing fluid flow between input and output passages. When a respective spool element 210–220 is in the rightmost position as viewed in FIG. 1, the input and output passages are connected. Each of the fluid valves 180–190 includes an exhaust passage, as indicated by the circled letters EX, such passage serving to drain fluid from the respective clutching device when the spool element is shifted to the leftmost position as viewed in FIGS. 1b. In FIG. 1b, the spool elements 210 and 212 of fluid valves 180 and 182 are shown in the rightmost position connecting the respective input and output lines, while the spool elements 214, 216, 218 and 220 of the fluid valves 184, 186, 188 and 190 are shown in the leftmost position connecting the respective output and exhaust lines. Each of the fluid valves 180–190 includes a solenoid 222–232 for controlling the position of its spool element 210–220. Each such solenoid 222–232 comprises a plunger 234–244 connected to the respective spool element 210–220 and a solenoid coil 246–256 surrounding the respective plunger. One terminal of each such solenoid coil 246–256 is connected to ground potential as shown, and the other terminal is connected to an output line 258–268 of a control unit 270 which governs the solenoid coil energization. As set forth hereinafter, the control unit 270 pulse-width-modulates the solenoid coils 246–256 according to a predetermined control algorithm to regulate the fluid pressure supplied to the pressure regulator 68 and the clutching devices 26–34, the duty cycle of such modulation being determined in relation to the desired magnitude of the supplied pressures.

While the fluid valves 180–190 have been illustrated as spool valves, other types of valves could be substituted therefor. By way of example, valves of the ball and seat type could be used. In general terms, the fluid valves 180–190 may be mechanized with any three-port pulse-width-modulated valving arrangement.

Input signals for the control unit 270 are provided on the input lines 272–284. A position sensor (S) 286 responsive to movement of the manual valve shaft 142 provides an input signal to the control unit 270 via line 272. Speed transducers 288, 290 and 292 sense the rotational velocity of various rotary members within the transmission 14 and supply speed signals in accordance therewith to the control unit 270 via lines 274, 276 and 278, respectively. The speed transducer 288 senses the velocity of the transmission shaft 42 and therefore the turbine or transmission input speed $N_t$; the speed transducer 290 senses the velocity of the drive axle 22 and therefore the transmission output speed $N_o$; and the speed transducer 292 senses the velocity of the engine output shaft 18 and therefore the engine speed $N_e$. The position transducer 294 is responsive to the position of the engine throttle 16 and provides an electrical signal in accordance therewith to control unit 270 via line 280.

A pressure transducer 296 senses the manifold absolute pressure (MAP) of the engine 12 and provides an electrical signal to the control unit 270 in accordance therewith via line 282. A temperature sensor 298 senses the temperature of the oil in the transmission fluid reservoir 64 and provides an electrical signal in accordance therewith to control unit 270 via line 284.

Figure 6:
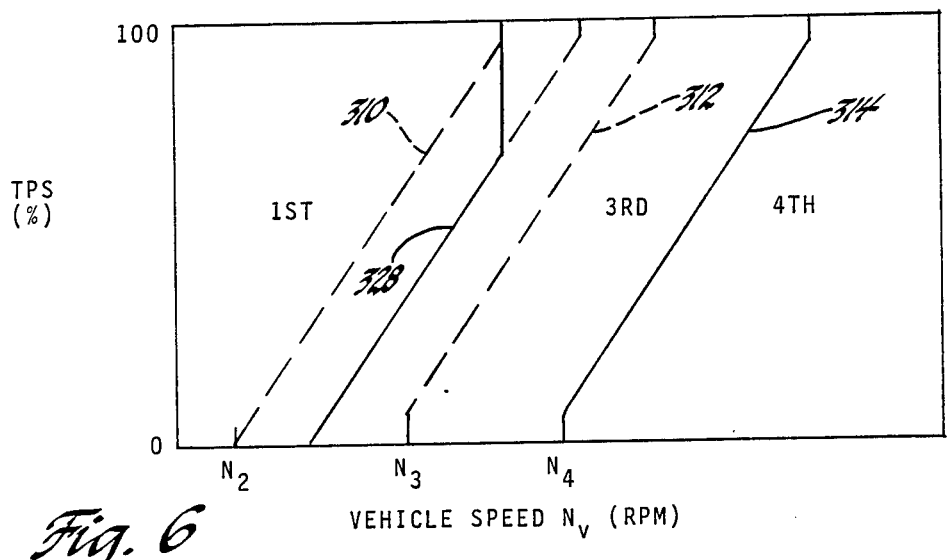
Figure 7:
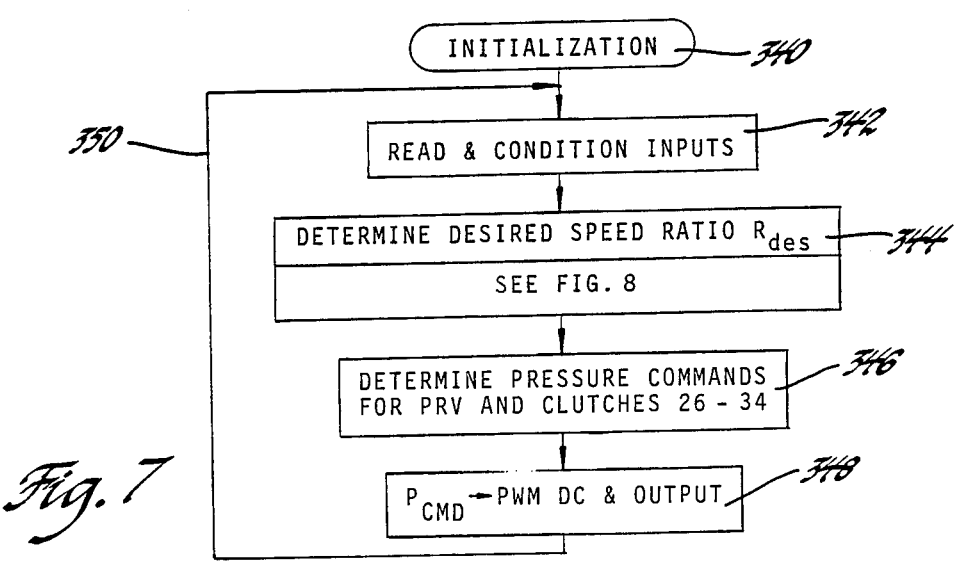
FIGS. 7-8 depict flow diagrams representative of suitable program instructions executed by the computer based controller of FIG. 1 for carrying out the control functions of this invention.

The control unit 270 responds to the input signals on input lines 272–284 according to a predetermined control algorithm as set forth herein, for controlling the energization of the fluid valve solenoid coils 246–256 via output lines 258–268. As such, the control unit 270 includes an input/output (I/O) device 300 for receiving hhe input signals and outputting the various pulse-width-modulation signals, and a microcomputer 302 which communicates with the I/O device 300 via an address-and-control bus 304 and a bidirectional data bus 306. Flow diagrams representing suitable program instructions for carrying out the control functions of this invention are depicted in FIGS. 6 and 7.

Figure 2:
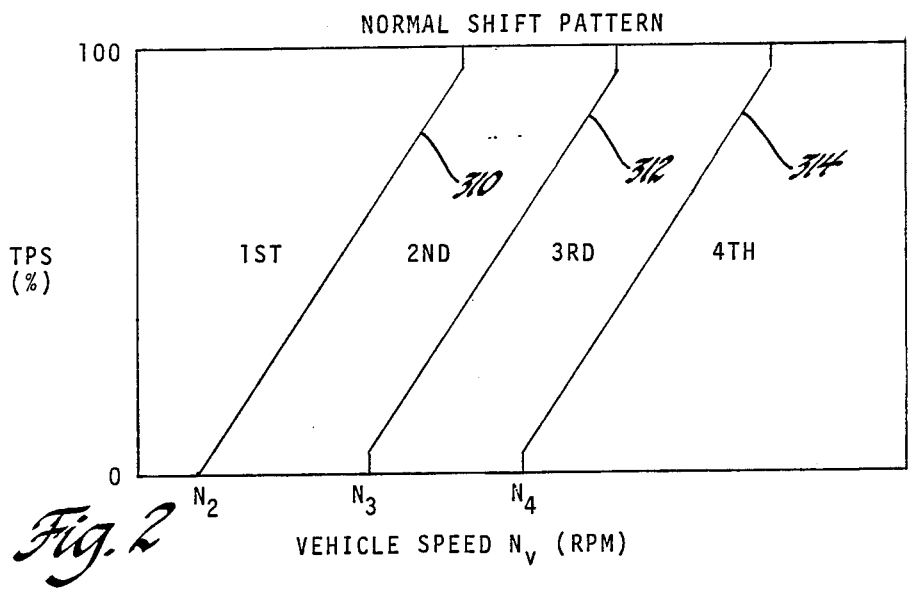
FIGS. 2-6 graphically depict the operation of this invention in relation to various shift pattern schedules.

As indicated above, FIG. 2 graphically depicts a conventional shift pattern for an automatic transmission having four forward speed ratios. The 1–2 shift line is designated by the reference numeral 310; the 2–3 shift line is designated by the reference numeral 314. The shift lines 310–314 divide the table into four desired speed ratio regions, designated 1ST, 2ND, 3RD AND 4TH, and corresponding to the FIRST, SECOND, THIRD and FOURTH speed ratios defined above in reference to FIGS. 1a–1b.

In practice, vehicle speed information corresponding to the traces 310–314 are stored in the control unit memory as a function of throttle position %T. In controlling transmission shifting, the control unit 270 addresses the tables associated with the currently engaged gear as a function of throttle position %T. This yields a vehicle speed related term which must be achieved before a different speed ratio is designated as the desired speed ratio $R_{des}$. An upshift or downshift to the desired ratio $R_{des}$ is initiated if it is not already engaged. As indicated above, a margin of hysteresis is usually employed to distinguish upshifts from downshifts for minimizing hunting.

Figure 3:
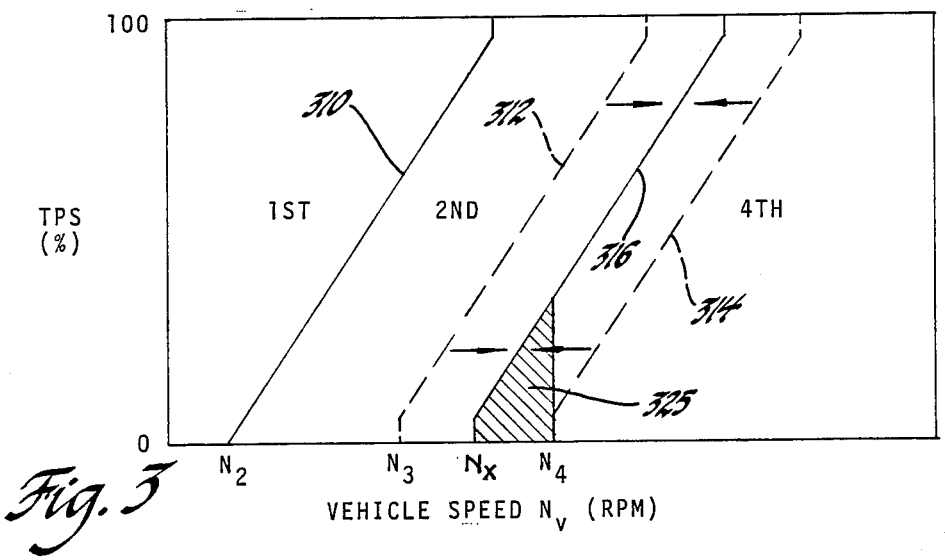
Figure 4:
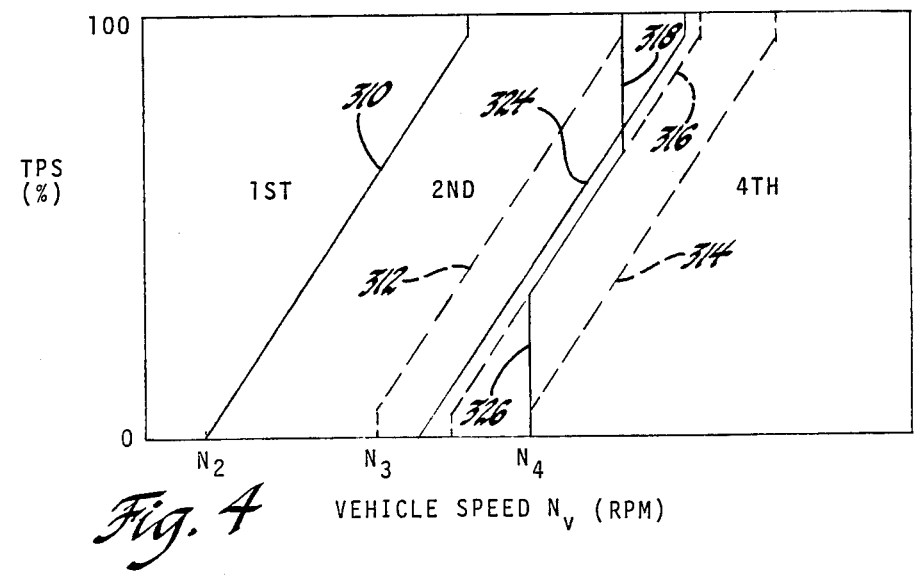

The operation of the shift pattern alteration control of this invention in response to an indicated failure of the THIRD speed ratio is graphically depicted by the shift pattern schedules of FIGS. 3 and 4. First, the shift point lines involving the failed ratio—that is, the 2–3 shift point line 312 and the 3–4 shift point line 314—are removed and replaced with a single new shift point line. This operation is graphically depicted in the schedule of FIG. 3, the original shift point lines 312 and 314 being shown in phantom, and the new shift point line being designated by the reference numeral 316. In effect, the line 316 is a 2–4 shift point line.

According to this invention, the new shift point line 316 is determined according to the arithmetic average of the two original shift point lines 312 and 314. Graphically, the new shift point line 316 is centered between the two original shift point lines 312 and 314. The shift pattern table is now divided into three desired speed ratio regions corresponding to the FIRST, SECOND and FOURTH speed ratios, thereby reflecting the unavailability of the failed THIRD speed ratio.

Once the two shift point lines 312 and 314 involving the failed THIRD speed ratio have been replaced with the new shift point line 316, such new shift point line 316 is modified to take into account the upper and lower speed limitations of the engine 12.

With respect to the upper, or red line, engine speed limitation, the shift point line 316 must be limited so that FOURTH is the desired speed ratio $R_{des}$ when the vehicle speed is so high that the upper speed limit would be exceeded with the SECOND speed ratio engaged. This limitation is graphically depicted in the schedule of FIG. 4, where the upper end of the shift point line 316 is now shown in phantom and the speed limited segment is designated by the reference numeral 318.

The lower engine speed limitation concerns driveability of the vehicle in relation to the operation of the torque converter clutch 26. In the illustrated embodiment, engagement of the torque converter clutch 26 is enabled when SECOND, THIRD or FOURTH speed ratios are engaged. Such engagement is scheduled for each such speed ratio primarily as a function of vehicle speed by a converter clutch look-up table, similar to the shift pattern tables depicted in FIGS. 2–5. The intent is to engage the converter clutch 26 at as low a vehicle speed as possible without causing an excessive level of drive train vibration, and to avoid perceived busyness of the transmission caused by excessive converter clutch activity.

Figure 5:
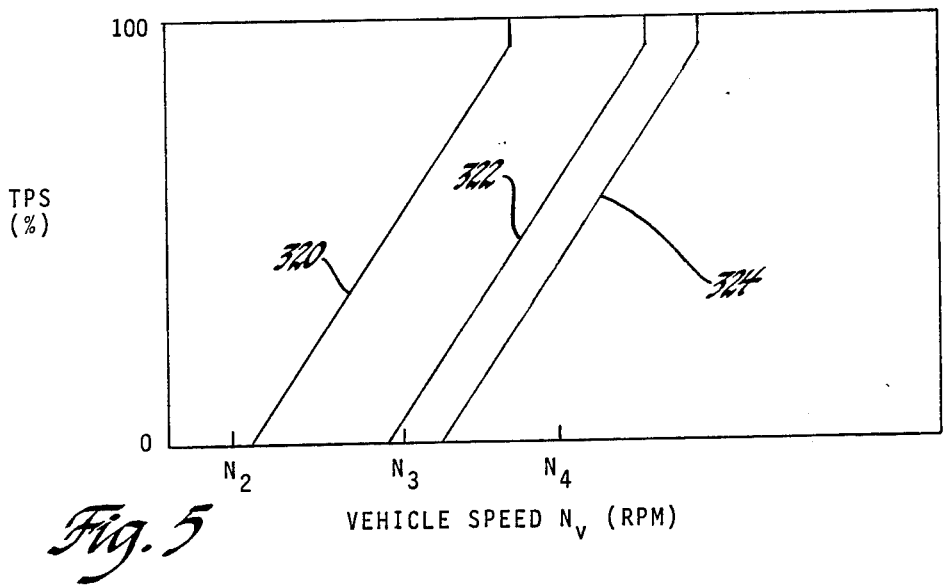

Representative ON-OFF torque converter clutch control lines are for SECOND, THIRD and FOURTH speed ratios are depicted on a single table in FIG. 5 by the traces 320, 322, and 324, respectively. For each of the SECOND, THIRD and FOURTH speed ratios, the control unit 270 engages the converter clutch 26 if the %T vs. $N_v$ operating point lies to the right of the respective ON-OFF clutch control line, and disengages the converter clutch if the %T vs. $N_v$ operating point lies to the left of the respective ON-OFF clutch control line.

The ON-OFF control line for SECOND gear lies slightly to the right of the 1–2 shift point line 310 so that the torque converter clutch 26 will engage shortly after a 1–2 upshift. The ON-OFF control line for THIRD gear lies slightly to the left of the 2–3 shift point line 312 so that the torque converter clutch 26 remains engaged during the 2–3 upshift. The ON-OFF control line for FOURTH gear lies slightly to the approximately midway between the 2–3 and 3–4 shift point lines 312 and 314; this causes the torque converter clutch 26 to remain engaged during the 3–4 upshift, and also avoids transmission busyness during the operation of this invention, as indicated below. Periodically in the operation of the vehicle, the control unit determines which speed ratio is engaged and then engages or disengages the clutch 26 as a function of vehicle speed and throttle position using the appropriate look-up table. Unlike the speed ratio shift point lines, however, the converter clutch ON-OFF control lines are not modified when a failed ratio is indicated; engagement of the clutch 26 is controlled according to the speed ratio actually engaged.

If the torque converter clutch 26 is engaged before the new shift point line signals a two-ratio shift to the next available higher gear, a shift point line altered according to this invention may result in a premature upshift which produces excessive vibration and gear stress. In such event, the new shift point line is further modified according to this invention to create a minimum vehicle speed limitation which must be satisfied before the upshift can occur. The minimum speed limitation for the new shift point line is the same as the limitation for the factory calibrated shift point line 310–314 depicted in FIG. 2.

In the THIRD gear failure depicted in FIG. 3, for example, the minimum vehicle speed limitation $N_x$ for a 3–4 upshift defined by the new shift point line 316 is significantly lower than the factory calibrated value of $N_4$. Graphically, the new shift point line would permit a 2–4 upshift to occur in the shaded region 325. If the converter clutch 26 is not engaged, the shift can occur in the region 325 without degrading the driveability of the vehicle. However, if the converter clutch 26 is engaged in SECOND gear, a 2–4 upshift in the region 325 will produce an excessive level of gear stress and vibration in the vehicle frame and body panels.

A premature upshift and the consequences associated therewith are avoided according to this invention by raising the minimum vehicle speed limitation of the new shift point line to that of the upshifted gear if the converter clutch 26 would be engaged during the shift. In the situation depicted in FIG. 3, for example, the shift point line 316 is modified, as indicated by the line segment 326 in FIG. 4, so that a 2–4 upshift cannot occur unless the vehicle speed is $N_4$ or greater. If the converter clutch 26 is not engaged prior to the shift, the new shift point line 316 remains as shown in FIG. 3, and the torque converter 24 absorbs the shift-related vibration. Significantly, the FOURTH gear ON-OFF control line 314 for the converter clutch 26 is calibrated as shown in FIG. 4 so that clutch 26 remains engaged after a 2–4 scheduled by the new shift point line 316.

Under other failure conditions, the torque converter clutch 26 may be disengaged before the new shift point line signals a two-ratio shift to the next available higher gear. In such case, the converter clutch remains disengaged during the shift and the minimum vehicle speed modification, described above in reference to FIGS. 3 and 4, is not applied to the new shift point line. This condition is illustrated in the example depicted in FIG. 6, where a failure of the SECOND speed ratio is indicated. In such event, the shift pattern alteration control of this invention operates as described above to replace the 1-2 and 2-3 shift point lines 310 and 312 with a new 1-3 shift point line designated by the reference numeral 328. This divides the shift point table into three desired speed ratio regions 1ST, 3RD and 4TH, corresponding to the FIRST, THIRD and FOURTH speed ratios. As illustrated in FIG. 5, the converter clutch 26 will not engage until sometime after the 1-3 upshift.

the event of an indicated failure of the lowermost or FIRST speed ratio, the 1-2 shift point line 310 is removed and replaced with a vertical line at zero vehicle speed. Analogously, the 3-4 shift point line 314 is removed and replaced with a vertical line at an unattainable vehicle speed in the event of an indicated failure of the uppermost or FOURTH speed ratio.

Multiple indicated speed ratio failures are individually handled as described above, with each new shift point line being determined from the shift point lines in use which involve the failed speed ratio. If two numerically successive ratios fail, SECOND and THIRD for example, the new shift point line would designate a 1-4 shift. Such line would also be subject to limiting engine overspeed in the lower ratio. A failure of both FIRST and SECOND ratios is handled in the same manner as a FIRST ratio failure; a failure of THIRD and FOURTH ratios is handled in the same manner as a FOURTH ratio failure. If all but one ratio is failed, no shift pattern is necessary.

Figure 8:
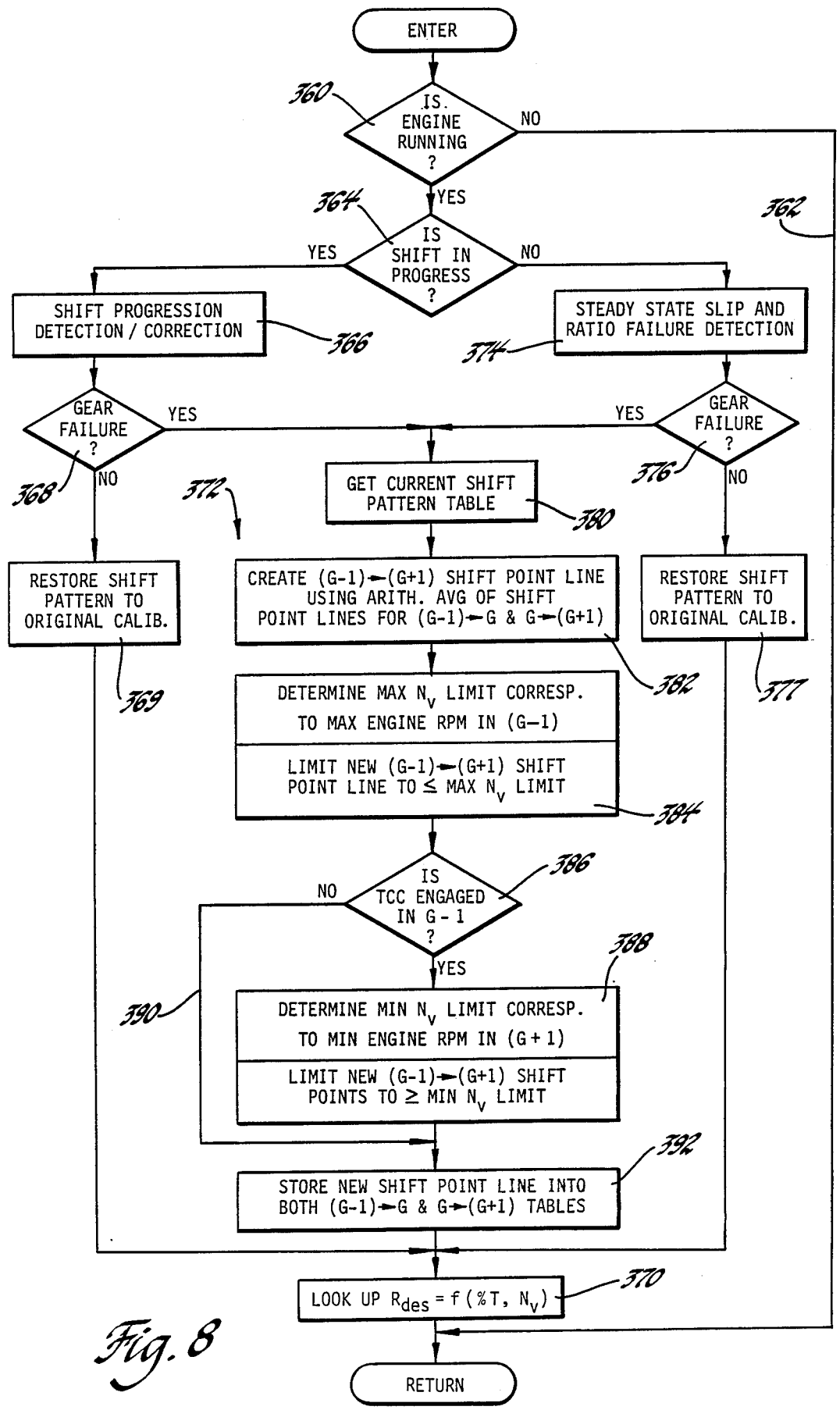

The flow diagrams depicted in FIGS. 7 and 8 represent program instructions to be executed by the microcomputer 302 of control unit 270 in mechanizing the clutch pressure detection/correction control functions of this invention. The flow diagram of FIG. 7 represents a main or executive program which calls various subroutines for executing particular control functions as necessary. The flow diagram of FIG. 8 represents the subroutine functions pertinent to the present invention.

Referring now more particularly to FIG. 7, the reference numeral 340 designates a set of program instructions executed at the initiation of each period of vehicle operation for initializing the various registers, timers, etc. used in carrying out the control functions of this invention. Following such initialization, the instruction blocks 342–348 are repeatedly executed in sequence as designated by the flow diagram lines connecting such instruction blocks and the return line 350.

Instruction block 342 serves to read and condition the various input signals applied to I/O device 300 via the lines 272–284 and update (increment) the various control unit timers. Instruction block 344 determines pressure commands for both the pressure regulator valve PRV and the clutching devices 26–34, based primarily on the input torque indication $T_i$. Instruction block 346 determines the desired speed ratio, $R_{des}$. This function involves ratio failure analysis, the shift point alteration of this invention and desired ratio look-up, and is depicted in greater detail in the flow diagram of FIG. 8 as indicated. Instruction block 348 converts the clutching device and PRV pressure commands to a PWM duty cycle based on the operating characteristics of the various actuators (empirically determined), and energizes the actuator coils accordingly.

Referring now more particularly to the flow diagram of FIG. 8, it is first determined at decision block 360 if the engine 12 is running. If not, the remainder of the routine is skipped, as indicated by the flow diagram line 362. If the engine is running, the decision block 364 is executed to determine if a speed ratio shift is in progress.

If a shift is in progress, the block 366 is executed to monitor the progression of the shift and to detect and indicate a failure of the oncoming clutch or gear. This may be done, for example, by measuring the elapsed time of the shift and comparing the measured value with a reference time. If the shift fails to progress as expected, even when high clutch pressure is commanded, a failure of the desired ratio is indicated.

If a ratio failure is not indicated by the shift progression routine, as determined at the decision block 368, the instruction blocks 369 and 370 are executed to restore the original calibration to the desired ratio look-up table, and to look up the desired gear ratio $R_{des}$ as a function of throttle position (%T) and transmission output speed ($N_o$). If a ratio failure is indicated at decision block 368, the flow diagram portion, designated generally by the reference numeral 372, is executed to adjust the scheduled shift point look-up table as described below to reflect the unavailability of the failed ratio.

If a shift is not in progress, the block 374 is executed to carry out a steady state slippage detection/correction control routine. This routine detects the slippage between the turbine and output shafts of transmission 14 and increases the clutch pressure if excessive slippage is detected. If the increased pressure fails to eliminate the excessive slippage, a failure of the desired ratio is indicated. Such routine is the subject of co-pending patent application Ser. No. 101,833, filed Sept. 27, 1987, and assigned to the assignee of the present invention.

If no gear failure is indicated by the steady state slippage correction/detection routine, as determined at the decision block 376, the instruction blocks 377 and 370 are executed to restore the original calibration to the desired ratio look-up table, and to look up the desired gear ratio $R_{des}$ as a function of the throttle position %T and the transmission output speed $N_o$. If a gear failure is indicated, the flow diagram portion 372 is executed to adjust the scheduled shift point table as described above in reference to FIGS. 2-6 to reflect the unavailability of the failed ratio.

Referring now to the flow diagram portion generally designated by reference numeral 372, the decision block 380 is first executed to retrieve the current shift pattern table from the memory of control unit 270. Assuming that the failed gear is designated as G, the instruction block 382 is then executed to create a shift point line from the next lower ratio (G−1) to the next higher ratio (G+1). If such ratios exist, the control unit 270 generates a new shift point line using the arithmetic average of the shift point lines involving the failed gear G. In practice, this is achieved by addressing the (G−1) to G and the G to (G+1) shift point tables as a function of the various stored throttle positions, and in each case, storing the arithmetic average of the resulting vehicle speed values in both tables. Thereafter, both tables contain the (G−1) to (G+1) vehicle speed shift point values. The original shift point tables are not destroyed, as it will be necessary to return to them when the speed ratio failure has been corrected.

Once the shift point tables have been modified by the instruction block 382, the instruction block 384 is executed to determine a maximum vehicle speed limit corresponding to the maximum engine speed in the next lower gear ratio (G−1), and to limit the new shift point line so that the maximum engine speed is not exceeded. In practice, this is achieved by addressing the (G−1) to (G+1) shift point tables as a function of the various stored throttle positions, and in each case, limiting the resulting vehicle speed value to the maximum vehicle speed for the (G−1) ratio.

If the torque converter clutch 26 is applied as determined at decision block 386, the instruction block 388 is then executed to limit the new shift point line so that the shift to (G+1) does not occur until the vehicle speed reaches the minimum engagement speed of the torque converter clutch 26 in the higher ratio (G+1). In practice, this is achieved by addressing the (G−1) to (G+1) shift point tables as a function of the various stored throttle positions, and limiting the resulting vehicle speed values to the minimum vehicle speed for the (G+1) ratio. In low throttle operating conditions, this delays the upshift to minimize the gear stress and vibration which would otherwise occur.

If the torque converter clutch 26 is not enabled, the new shift point line is not limited for minimum vehicle speed, and the shift to the (G+1) ratio occurs with the clutch 26 disengaged. In such case, the execution of instruction block 388 is skipped, as indicated by the flow diagram line 390. Thereafter, the instruction block 392 is executed to replace the original shift point lines involving the failed ratio G with the new shift point line from the ratio (G−1) to the ratio (G+1). Thereafter, the instruction block 370 is executed as described above to look up the desired ratio $R_{des}$ now using the altered shift point table.

While this invention has been described in reference to the illustrated embodiment, it will be understood that various modifications thereto will occur to those skilled in the art and that systems incorporating such modifications may fall in the scope of this invention which is defined by the appended claims.

The embodiments of the invention in which an exclusive property or privilege is claimed are defined as follows:

1. Shift pattern control apparatus for a motor vehicle transmission shiftable between successively engageable forward speed ratios including a lowermost speed ratio, an uppermost speed ratio, and one or more intermediate speed ratios, the apparatus comprising:
   electrically alterable memory means having stored therein as a function of speed ratio and driver demand previously determined information corresponding to a vehicle speed at which a transmission shift from said speed ratio should occur;
   look-up means for retrieving previously determined speed information from said memory means pertaining to the current speed ratio and driver demand for comparison with an indication of the actual vehicle speed to schedule shifting from said current speed ratio; and
   override means effective in response to the detection of a failure of an intermediate speed ratio for electrically altering the speed information stored in said memory means such that the previously determined information used to schedule shifting between such failed intermediate speed ratio and successively higher and lower speed ratios is replaced with new speed information determined according to an arithmetic combination thereof, whereby further shifting between such successively higher and lower speed ratios is scheduled in accordance with the new speed information.

2. The apparatus set forth in claim 1, wherein the override means determines the new speed information according to the arithmetic average of the previously determined speed information used to schedule shifting between the failed intermediate speed ratio and the successively lower speed ratio, and the previously determined speed information used to schedule shifting between the failed intermediate speed ratio and the successively higher speed ratio.

3. The apparatus set forth in claim 1, including an engine connected rotatably drive the transmission, wherein th override means includes means further comprises:
   means for limiting the new speed information to less than a limit value which would cause the rotary speed of the engine to reach an undesirably high value with the successively lower speed ratio engaged.

4. The apparatus set forth in claim 1, including an engine connected to rotatably drive the transmission through a fluid coupling, and a coupling device effective when activated to rigidly couple said engine and transmission, wherein the override means includes means further comprises:

means effective when the clutching device is activated during the engagement of the successively lower speed ratio for limiting the new speed information to greater than a limit value which would cause the rotary speed of the engine to reach an undesirably low value with the successively higher speed ratio engaged.

* * * * *